Nov. 30, 1926. 1,608,816

L. L. RUARK

TIRE TREAD VULCANIZING MOLD

Filed March 15, 1926

Inventor
LANNIE L. RUARK

Attorney

Patented Nov. 30, 1926.

1,608,816

UNITED STATES PATENT OFFICE.

LANNIE L. RUARK, OF COALINGA, CALIFORNIA.

TIRE-TREAD-VULCANIZING MOLD.

Application filed March 15, 1926. Serial No. 94,827.

The present invention relates to improvements in molds for use in connection with vulcanizing tires.

More particularly the invention proposes a mold that is adapted for use in connection with vulcanizing new treads upon tires.

The general object of the invention is the provision of a vulcanizing mold which when used in the operation of retreading the shoes of rubber tires, will not operate to apply heat to the side walls of the shoe inwardly beyond the tread, but to confine the heat for vulcanizing purposes to the tread itself. In this way all liability to injury of the side walls from excessive heat is avoided.

The above and other objects are accomplished by instrumentalities pointed out in the following specification.

The invention is clearly defined in the claim.

A satisfactory embodiment of the invention is illustrated in the accompanying drawings forming part of the specification and in which Figure 1 is a side elevation of the complete device.

Figure 2 is a vertical cross section on the line 2—2 of Figure 1, looking in the direction of the arrows.

Figure 3 is a view similar to Figure 1, of a modified form of the invention with a portion of the side walls of the sections removed to disclose the construction and relation of other parts.

Figure 4 is a detail cross section taken on the line 4—4 of Figure 3, and looking in the direction of the arrows, and Figure 5 is a view similar to Figure 4, but taken on the line 5—5 of Figure 3, and looking in the direction of the arrows.

The mold of the present invention comprises a body 5 and, in the form shown in Figure 1, this body is made up of two sections 6 and 7 each of annular contour. The sections 6 and 7 correspond one with the other in point of size and are adapted to be arranged one upon the other and in concentric relation. Each of the sections 6 and 7 is hollow, and its interior constitutes a steam chamber 8. The confronting faces of the sections 6 and 7 are flat so that when the sections are arranged concentrically and one alongside the other as shown, the chambers 8 are parallel.

The inner peripheral walls 9—9 of the chambers 8—8 combine to provide a surface of arcuate contour in cross section, and this surface may have engraved thereon, or otherwise formed, a suitable tread pattern. The inner walls 9—9 surround an opening which nicely receives the shoe of the tire to be operated upon, so that the side walls 9—9 are adapted to bear upon the adjacent tread surface of the shoe. Suitable pipe fittings 10—10 extend into the outer side walls of the steam chambers 8—8 and are adapted for connection to the usual flexible tubes employed for conveying steam from a suitable source of supply, as is usual in devices of this kind.

The sections 6 and 7 are held together against displacement by means of clamping screws 12 which are screwed into radially disposed lugs upon the sections.

In the modified form shown in Figure 3, the mold comprises a body 15 made up of two-semi-circular sections 16 and 17. Radially disposed lugs 18—18 upon an end portion of each of the sections 16 and 17 are adapted to interfit and be connected together by a pin 19 which adapts the lugs to function as a hinge for connecting the sections 16 and 17 and permitting angular movement thereof. The free ends of the sections 16 and 17 are adapted to be detachably held together by a pivoted latch member 20 connected to one of the sections and adapted to engage with a keeper 21 upon the adjacent section. The inner periphery of the sections 16 and 17 when these are connected by the latch, is substantially continuous and when viewed in cross section correspond to the tread of the tire shoe to be operated upon. 22 and 23 respectively denote steam chambers in each of the sections 16 and 17. The chambers in each section are open-ended and each communicates with the other and with the chambers of the adjacent section when the sections are secured by the latch 20, as shown in Figure 3.

Suitable nipples 24 and 25 extend into the chambers 22 and 23 and are adapted for connection to the usual flexible tubes extending from a source of steam supply, as is ordinary in the use of a device of this kind. 26 and 27 are pet-cocks leading from the chambers 22 and 23 to one of the sections and when the valves of these cocks are open, the chambers may be effectively drained of water formed therein by condensation.

In the preferred form, 28 and 29 indicate pet-cocks connected to the chambers 8—8 and operating to function as drains in the manner described for the pet-cocks 26 and 27.

In the use of either form of the present device, the tire shoe to be operated upon is provided with a tread of raw rubber after which the usual inflatable bags are arranged within the shoe. The sections of the device shown in the preferred form are then arranged so that the inner peripheral walls 9 of the sections 6 and 7 are made to bear upon the tread of the tire shoe. The sections 6 and 7 are then clamped together by screws after which steam is caused to circulate through the chambers 8—8.

In the modified form, the tire shoe with its tread of raw rubber and inflatable bags is disposed between the sections 16 and 17 when these are spread apart after which the sections are brought together, whereupon the inner peripheral walls of the sections are brought into contact with the tread. The sections are then locked by the latch 20 after which steam is then circulated through the chambers 22 and 23. It will be noted that with the use of the present invention, the steam chambers 8—8 and 22 and 23 are disposed radially outward and beyond the side wall of the tire shoe being operated upon so that the heated walls of these chambers, by virtue of their position, cannot operate upon the side walls of the tire shoe and thereby injure the same. It has been found in practise that the device of the present invention operates to perform the act of vulcanizing a tread more rapidly than in cases where the steam chamber extends downwardly and over the opposite side walls of the tire shoe. It is to be understood that in the operation of vulcanizing the tread, the required amount of air pressure is introduced into the inflatable bags within the shoes so as to hold the shoes relatively rigid and force the tread to be vulcanized into intimate contact with the adjacent wall of the mold.

Although I have shown and described one embodiment of my invention, it is to be understood that the same is susceptible of various changes; and I reserve the right to employ such as may come within the scope of the appended claim.

I claim:

A vulcanizing mold for retreading rubber tire shoes comprising a hollow metallic body made up of a plurality of semi-circular sections adapted to be detachably connected together and having cooperating portions adapted to bear upon the entire tread surface of a tire shoe when the sections are connected together, each of said sections being interiorly provided with a plurality of steam chambers, the chambers of each section being in communication with each other and with the chambers of the other section when the sections are connected, the said sections being constructed so that the chambers thereof are disposed radially outward and beyond the side walls of a tire shoe when the shoe is arranged with its tread surface in contact with the tread bearing portions of the sections.

LANNIE L. RUARK.